United States Patent Office 3,085,117
Patented Apr. 9, 1963

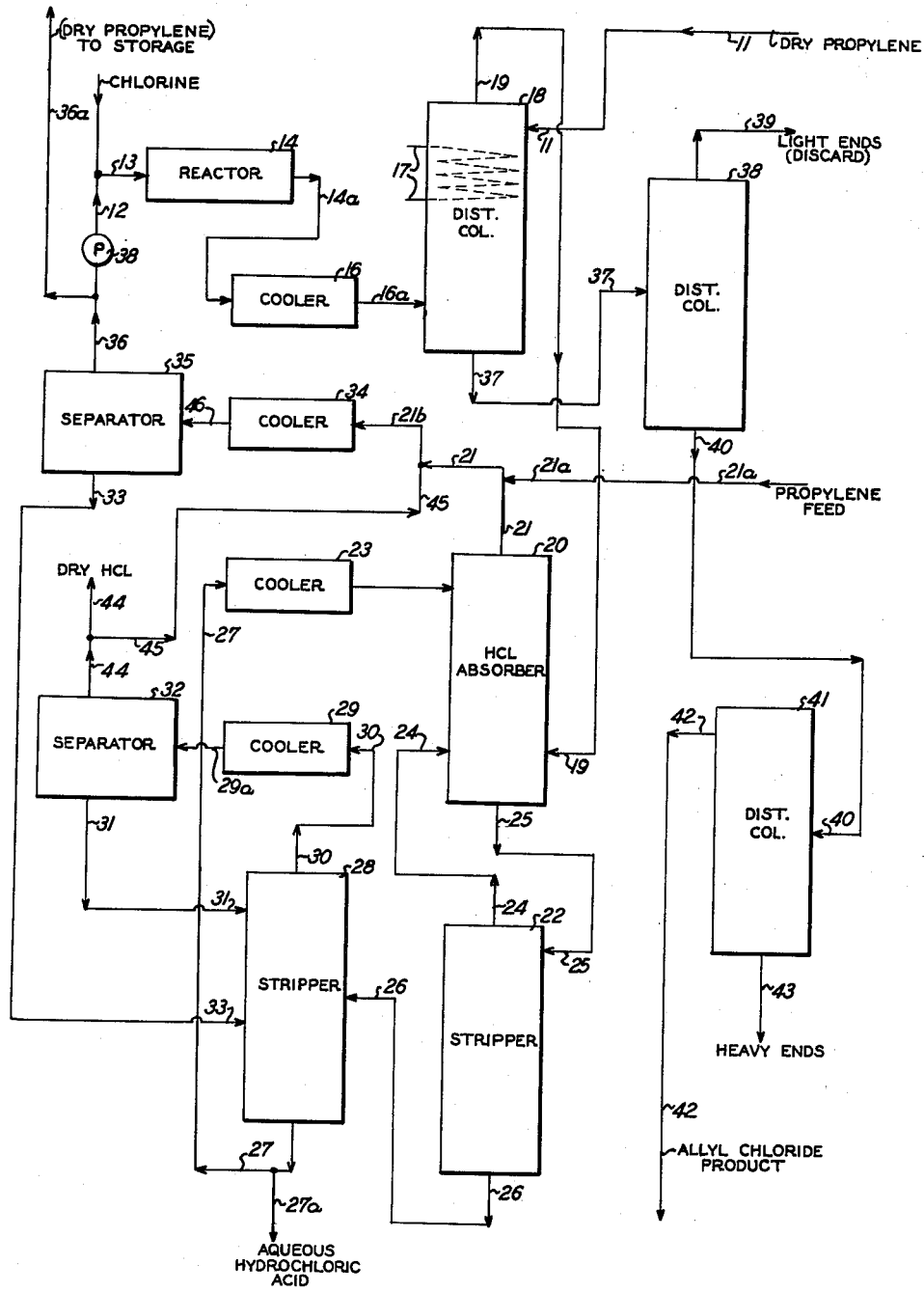

3,085,117
RECOVERY OF PRODUCTS IN ALLYL
CHLORIDE PREPARATION
David Brown, Greenwich, Conn., and John White Colton, Pelham Manor, N.Y., assignors to Scientific Design Company, Inc., a corporation of Delaware
Filed Dec. 22, 1960, Ser. No. 77,728
4 Claims. (Cl. 260—654)

This invention relates to processes for the production of allyl chloride by the high temperature chlorination of propylene, more particularly to such a process carried out in a continuous manner, and especially to such a process wherein the chlorination reactor feed propylene is dried by contact with anhydrous hydrogen chloride, cooling and separating. It also relates to apparatus for use therein.

Commercial production of allyl chloride by the high temperature chlorination of propylene involves the non-catalytic chlorination of propylene in the vapor phase at about 500 to 510° C. in adiabatic reactors (see for instance Chemical Engineering Progress, "Trans Section," vol. 43, No. 6, June 1947, starting on page 280).

The reactor effluent is fractionated to take off by-product hydrogen chloride and unreacted propylene, and the residue is then processed in a first distillation column to remove light ends overhead and then in a second distillation column to remove the allyl chloride product as overhead, and leave a heavy ends residue. The feed or recycle propylene is wet and is subjected to a drying treatment before mixing with the chlorine, which treatment includes caustic and hydrogen chloride consumption and alumina drying. The hydrogen chloride by-product is absorbed in water and recovered as concentrated aqueous hydrochloric acid. The propylene leaving the hydrochloric acid absorber is scrubbed with caustic and then compressed and stored with fresh feed propylene. The foregoing operation is economically disadvantageous because of the costs of the drying treatments. The art is confronted by the problem of providing even more efficient processes for the production of allyl chloride which avoid the foregoing disadvantages.

The discoveries associated with the invention and relating to the solution of the above problems, and the objects achieved in accordance with the invention as set forth herein include the provision of:

A process for the production of allyl chloride including the steps of reacting propylene with chlorine at elevated temperatures, fractionating the reactor effluent to remove unreacted propylene and by-product hydrogen chloride followed by distilling off light ends and then distilling allyl chloride as overhead product, leaving a heavy ends residue, and the improvement which comprises treating the distillate from the fractionating step with aqueous scrubbing liquor to remove hydrogen chloride and leave wet propylene and then distilling from the aqueous liquor anhydrous hydrogen chloride, contacting wet propylene with anhydrous hydrogen chloride, condensing of aqueous hydrochloric acid and separating anhydrous propylene;

Such a process wherein the separated propylene is included in the feed to the reacting step;

Such a process wherein the wet propylene is obtained from the aqueous scrubbing liquor treatment;

Such a process wherein the wet propylene includes fresh feed stock;

An apparatus adapted for use of the manufacture of allyl chloride comprising the combination of a reactor, a first distillation column, a second distillation column, and a third distillation column and in combination with the first distillation column, a hydrogen chloride absorber, in combination with a first stripper and a second stripper, a cooler and a separator and means for removing dry hydrogen chloride, and also in combination with the absorber means for removing moist propylene in combination with means for mixing said propylene with anhydrous hydrogen chloride and a cooler and a separator, and means for removing dry propylene;

And other objects which will be apparent as details or embodiments of the invention are set forth hereinafter.

The accompanying drawing is a schematic illustration of the invention.

In order to indicate still more fully the nature of the present invention, the following examples of typical procedures are set forth in which parts and percents means parts and percents by weight, respectively, it being understood that these examples are presented as illustrative only and are not intended to limit the scope of the invention.

Example 1

In the general reaction (following the drawing), dry propylene from line 12 is mixed with chlorine in line 13 and fed to reactor 14 wherein the thermal chlorination reaction occurs at about 500° to 510° C., using about 2 to 5 moles of propylene per mol of chlorine feed. The reactor effluent is passed via line 14a to cooler 16 and then via line 16a to distillation column 18. This column is provided with a cooler 17. Dry propylene reflux is introduced via line 11. The bottoms fraction is passed therefrom via line 37 to distillation column 38, from which a light ends cut is removed via line 39 and this cut may be discarded or collected. The bottoms fraction is removed via line 40 and passed into distillation column 41, from which allyl chloride product is removed as an overhead fraction via line 42, and a heavy ends cut is removed via line 43.

An overhead fraction is removed from column 18 via line 19 and passed into hydrochloric absorber 20, where it is contacted with aqueous absorbent. The resulting aqueous hydrochloric acid is passed via line 25 to stripper 22. An overhead fraction from stripper 22 which may contain hydrocarbons or chlorocarbons is passed via line 24 to absorber 20. The residue is passed via line 26 to stripper 28, and hydrogen chloride is removed as an overhead fraction via line 30 and passed to cooler 29 wherein moisture is condensed. It is then passed via line 29a to separator 32. The overhead from separator 32 is removed via line 44 and may be passed to dry hydrogen chloride storage. The bottom or liquid residue is passed from the separator 32 via line 31 to stripper 28. A liquid or bottoms fraction from stripper 28 is passed via line 27 to cooler 23 and then via line 23a to absorber 20. Aqueous hydrochloric acid may be removed via line 27a if desired.

The overhead or vapor fraction from absorber 20 is passed via lines 21 and 21b to cooler 34. Some dry hydrogen chloride from line 45 being mixed therewith in line 21, and the resulting mixture is cooled in cooler 34 so as to condense aqueous hydrochloric acid, and then the mixture is passed via line 46 to separator 35. The vapor overhead from this separator is dry propylene (containing less than 20 p.p.m. moisture) and may be passed via line 36 and pump 38 to line 12. Alternatively it may be passed to dry propylene storage via line 36a. Some of this material may be used as reflux which is introduced via line 11 into column 18.

In this example, the propylene feed is dry and is introduced via line 11. For 100 parts of propylene passed via line 21 per minute (containing 1.8 parts of water and 0.19 part of hydrogen chloride), 0.66 part of dry hydrogen chloride is added thereto from line 45 and the resulting mixture is passed via line 21b to the cooler 34 where it is cooled to minus 40° C. (−40° C.). The condensate from separator 35 contains 32 weight percent aqueous hydrochloric acid. The propylene in line 36 is dry (i.e. of less than 20 p.p.m. moisture).

*Example 2*

The procedure of Example 1 is repeated except that 10 parts of hydrogen chloride are passed into the propylene mixture via line 45 and the mixture is cooled to minus 20° C (−20° C.) in cooler 34. The condensate in line 33 contains 40 weight percent aqueous hydrochloric acid. The propylene in line 36 is dry (i.e. of less than 20 p.p.m. moisture) but it contains about 8.3% hydrogen chloride This material is recycled to the reactor and the hydrogen chloride therein does not interfere with the reaction.

*Example 3*

The procedure of Example 1 is repeated except that the propylene feed is wet and is introduced via line 21a (25 parts of propylene containing 0.025 part of moisture per 100 parts of propylene per minute in line 21) and 0.67 part of anhydrous hydrogen chloride is added thereto from line 45 and passed to cooler 34. The cooled mixture is passed via line 46 to separator 35. The condensate which is passed via line 33 to stripper 28 contains 32% of aqueous hydrochloric acid. The propylene in line 36 is dry (i.e. of less than 20 p.p.m. moisture).

*Example 4*

The procedure of Example 2 is repeated except that the propylene is wet and is introduced via line 21a (25 parts of propylene containing 0.025% of moisture per 100 parts of propylene per minute in line 21) and about 12.5 parts of anhydrous hydrogen chloride is added thereto from line 45. The condensate in one line 33 contains about 40 percent aqueous hydrochloric acid. The propylene in line 36 is dry (i.e., of less than 20 p.p.m. moisture) but it contains about 8.3% hydrogen chloride. This material is recycled to the reactor and the hydrogen chloride therein does not interfere with the reaction.

It is to be noted that process of the invention avoids the consumption of hydrochloric acid as well as sodium hydroxide and eliminates the need of an expensive regenerative drying system, using alumina or the like. These changes result in decided economic advantages as well as more efficient plant operation.

In view of the foregoing disclosures, variations and modifications thereof will be apparent to one skilled in the art, and it is intended to include within the invention all such variations and modifications except as do not come within the scope of the appended claims.

What is claimed is:

1. In a process for the preparation of allyl chloride by the chlorination of propylene wherein by-product hydrogen chloride and unreacted propylene are separated from the reaction mass by fractionation and the hydrogen chloride separated from the propylene by scrubbing with an aqueous solution, the improvement of distilling the aqueous scrubber liquor containing hydrochloric acid; withdrawing hydrogen chloride and moisture as an overhead fraction; separating anhydrous hydrogen chloride from said overhead fraction; contacting wet propylene with said anhydrous hydrogen chloride; condensing hydrochloric acid; and separating anhydrous gaseous propylene from said hydrochloric acid condensate.

2. A process of claim 1 wherein the separated propylene is included in the feed to the chlorination step.

3. A process of claim 2 wherein the wet propylene is obtained from the scrubbing step.

4. A process of claim 2 wherein the wet propylene includes fresh feed stock.

References Cited in the file of this patent

FOREIGN PATENTS 794,408    Great Britain _____ May 7, 1958